Inventor
JOHN LEE WIGHT
By Irwin J. Thompson
Attorney

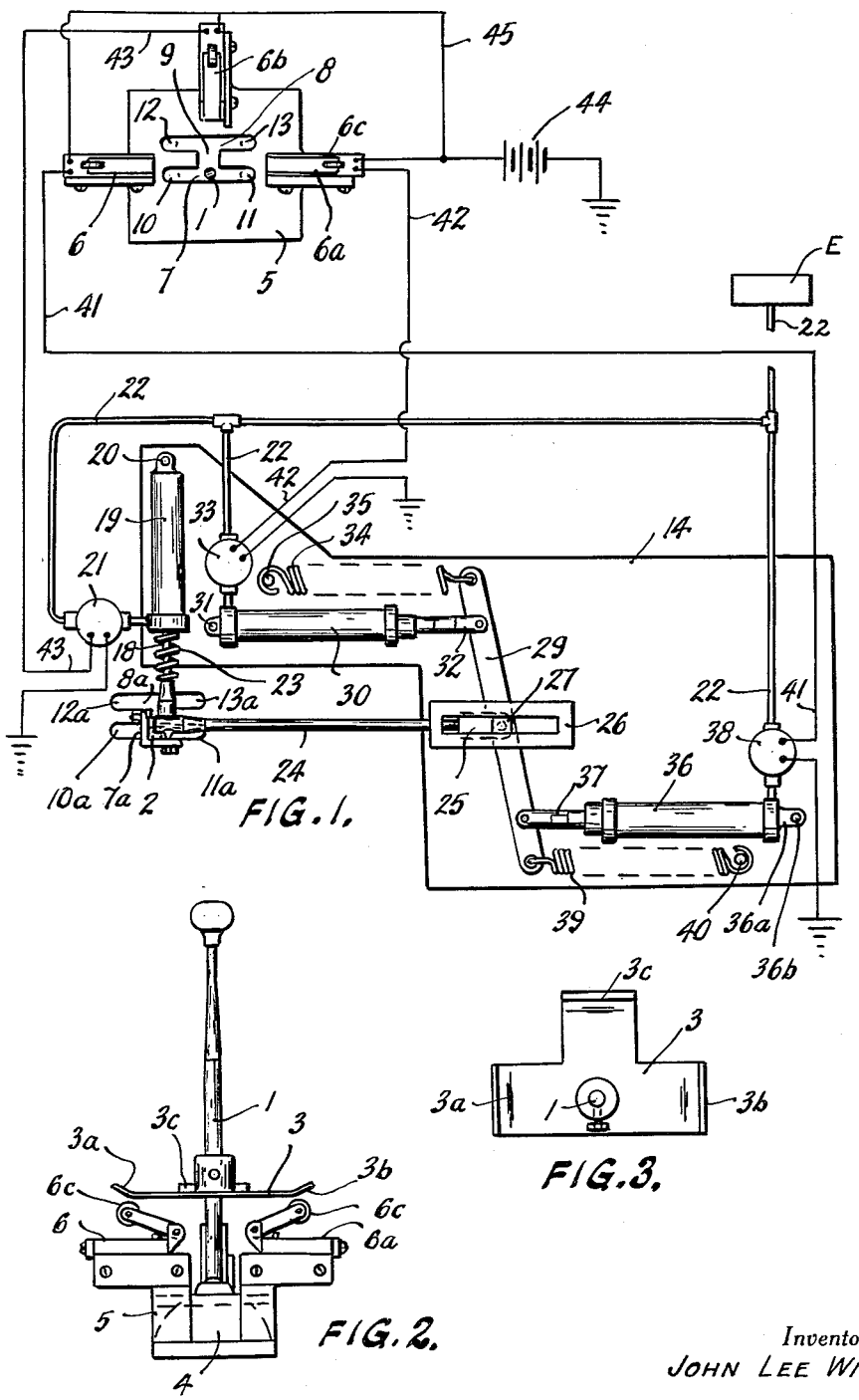

United States Patent Office 3,093,008
Patented June 11, 1963

3,093,008
REMOTE CONTROL FOR AUXILIARY
TRANSMISSIONS
John Lee Wight, Auckland, Auckland, New Zealand, assignor to Huntly Engineering & Welding Company Limited, Huntly, Auckland, New Zealand
Filed Aug. 15, 1960, Ser. No. 49,561
Claims priority, application New Zealand Aug. 18, 1959
9 Claims. (Cl. 74—335)

This invention relates to earth moving machines, trailer and articulated trucks and other forms of transporting and like vehicles which have dual power units, or one engine driven traction unit at the front of the vehicle and another at the rear, the objects of the present invention being the provision of a comparatively simple form of remote control apparatus which, on the driver seated on the front power unit effecting gear changing, will effect simultaneous or substantially simultaneous changing of the gear of the rear power unit, thereby enabling one driver to operate the vehicle.

Large vehicles for heavy haulage, for earth moving and for other purposes and having front and rear traction units are known wherein there are two drivers who effect the independent control of each of the power units, but such control by being divided is somewhat difficult, there also being known vehicles in which the control of both power units is effected by one driver, these being exceedingly complicated and very costly, the dual control of these in the main being effected by electrical equipment.

Our invention has been devised to enable this control of the dual power engine driven traction units to be effected by one driver and to enable the effecting of such control in a comparatively simple and cheap manner, the present invention however being concerned only in the effecting of gear changing and not in throttle and clutch control, which present no problem.

Broadly the invention comprises remote control apparatus for effecting gear changing of the auxiliary unit of dual power unit earth moving machines and the like comprising controller means applied to the front power or traction unit directly actuated by manually operated gear changing movements of the gear lever of the front power unit, remote control means applied to the rear power unit for mechanically effecting the gear changing movements of the gear lever of the rear power unit and connections between the controller means of the front power unit and the remote control means of the rear power unit whereby the gear lever movements of the front traction unit effect the gear lever movements of the rear traction unit.

Figures 4, 5:
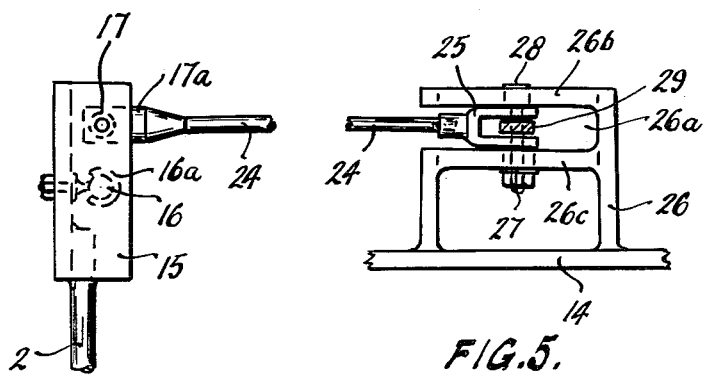
Figure 6:
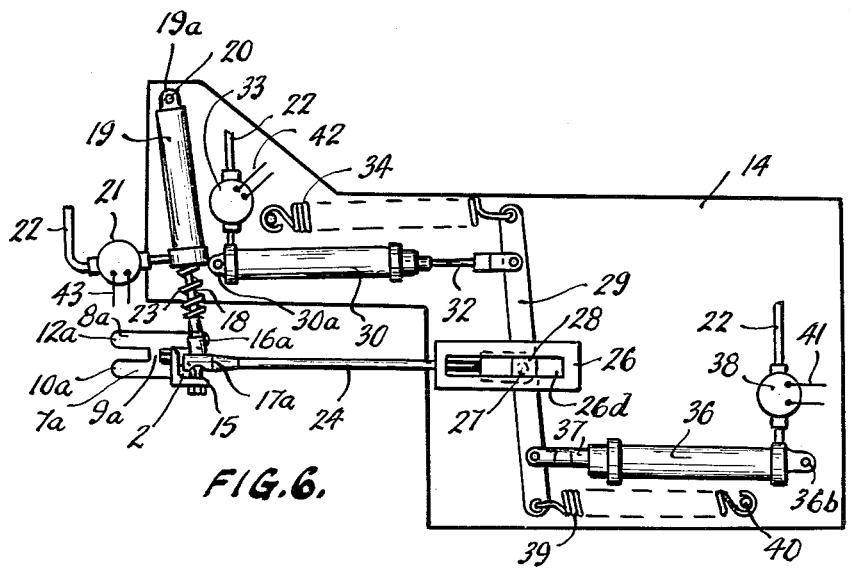
Figure 7:
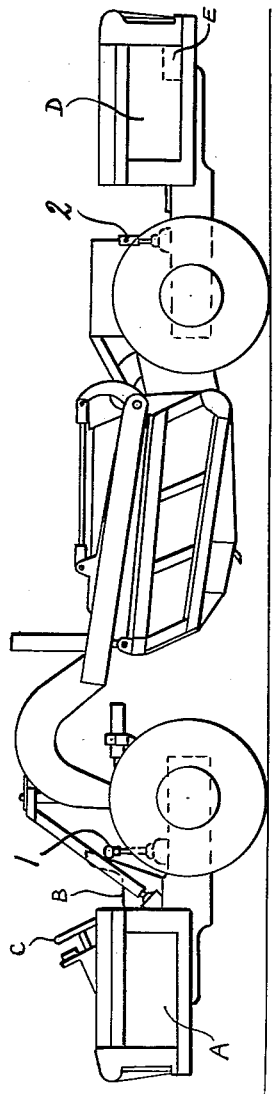

In describing the invention, reference will be made to the accompanying drawings in which:

FIGURE 1 shows a plan view of the remote control apparatus, with the cam plate of the manually operated gear lever removed to enable parts thereunder to be clearly seen, FIGURE 2 is a side elevation of the manually operated gear lever and the additional mechanism associated therewith, FIGURE 3 is a plan view of the cam plate, FIGURE 4 is a partial side elevation of the remote controlled gear lever, FIGURE 5 is an elevation of the crosshead guide, FIGURE 6 is a partial similar view to that of FIG. 1 but with the parts of mechanism moved to show a gear change position of the remote controlled gear lever, and FIG. 7 is a side elevational view of a vehicle, in which the present invention may effectively be used.

In the invention, it is the requirement that those movements of the gear shift lever 1 which are manually effected by the driver of the front power or traction unit A (FIG. 7) which includes seat B for the driver and steering wheel C be transmitted to the gear shift lever 2 of the rear power unit D which includes air vessel E and for this purpose therefore, it will be considered that the changes to be effected are those common to motor vehicles such as low, second and top gear and reverse, or there may be four or other number of forward gears in addition to reverse, this in any event means that the gear shift lever 1 has to be moved to one side or another in the neutral position and to move forward and backward from the midway neutral position. All of the controls for operating the vehicle are located on power unit A.

It was originally proposed to apply to the gear lever 1 various links, plungers and vacuum control valves whereby on movement of the said gear lever 1 to various gear change positions, vacuum would be applied and released through pipe lines to mechanism of the rear traction unit connected to the gear lever 2 thereof, this mechanism having been discarded in favour of the simpler and cheaper apparatus to be now described, the mechanism on the rear traction unit remaining substantially the same as previously except in respect of the use of compressed air as against vacuum and pressure cylinders in place of diaphragms whereby the bulk of the apparatus is appreciably reduced.

To the manually actuated gear lever 1 on the front traction unit a cam plate 3 is secured, this presenting three similar cam parts 3a, 3b and 3c of which the part 3a extends forward from the gear lever 1, the part 3b rearward and the part 3c to one side.

Preferably on top of the existing gear box 4 a suitable form of bracket 5 is secured and secured to this there are three suitable switches 6, 6a and 6b which may be of a type known as micro-switches and these have levers 6c applied which extend at an angle and in upward direction, said switches 6, 6a and 6b being disposed on the bracket 5 forward, rearward and to one side of the position of the gear lever 1 whereby they are under the cam parts 3a, 3b and 3c of the cam plate 3 on such gear lever 1 (see FIG. 2).

For the purpose of clearness and simplicity of description, it will be considered that the gear lever 1 is required to move within slots arranged in H formation (see FIG. 1) of which there are slots 7 and 8 spaced apart and parallel to each other connected by a central or neutral position slot 9, the ends of these slots 7 and 8 being the gear shift positions 10, 11, 12 and 13 to which the gear lever 1 is to be moved from the neutral position 9, this latter position apart from the actual slot 9 extending centrally into the slots 7 and 8.

Although the slots arranged in H formation are shown in the drawings, it is to be understood that these are not actual requirements of the apparatus but are for description purposes only, the gear box 4 itself making provision for the gear shift positions 10, 11, 12 and 13 in addition to the neutral position 9 into which the gear lever 1 can be moved.

On the rear power or traction unit a mounting plate 14 is secured in the vicinity of its gear shift lever 2 and on this plate 14 is applied the remote control mechanism which effects the movements of the gear lever 2.

The gear shift lever 2 may have the usual top handle portion thereof cut off and to the upper end of the lever 2 an angle plate or the like 15 is secured (as by welding) to have the ball parts 16 and 17 of ball and socket type connectors rigidly secured one to each of the inner faces of the flanges of the plate 15, the complementary socket 16a of the ball 16 being integral with or attached to the outer end of the piston rod 18 of a pressure cylinder 19, which has at that end thereof which is opposite to the piston rod end provided with a lug 19a through which a pivot pin or like 20 passes so as to pivotally secure the cylinder 19 to the mounting plate 14, the cylinder 19 extending in a sideways direction from the gear lever 2.

To the side of the piston rod end of the cylinder 19 a known form of solenoid actuated valve 21 is connected, an air pressure pipe 22 being connected to the latter and on the piston rod between the cylinder 19 and the socket 16a there is a compression spring 23 which yieldingly tends to move the piston rod 18 to an outward position. Air pressure pipe 22 is connected to air vessel E which supplies compressed air in a well-known manner.

Similarly as described in respect of the various gear change positions of the gear lever 1 of the front traction unit, it will be considered that there is an arrangement of H formation slots to the rear traction unit, there being therefore slots 7a and 8a with neutral position slot 9a and the gear shift positions 10a, 11a, 12a and 13a.

Therefore, the yielding action of the compression spring 23 on the piston rod 18 is to move the gear lever 2 into the slot 7a.

The complementary socket 17a of the ball 17 is integral with or attached to one end of a connecting rod 24 which at its rear end has a clevis 25 secured thereto, the latter being disposed within a crosshead guide 26 (see FIG. 5) in a space 26a therein between its upper and lower guide bars 26b and 26c which have similar slots 26d therein, the clevis 25 pivotally engaging a crosshead pin 27 which has upper and lower crosshead blocks 28 thereto which are slidable within the slots 26d.

Passing through the clevis 25 and pivotally disposed on the crosshead pin 27 there is a rocker arm 29 which extends equal or substantially equal amounts away from the crosshead pin 27, the piston rod ends of pressure cylinders being connected to near the opposite ends of such rocker arm 29.

A forwardly extending cylinder 30 has a lug 30a through which a pivot 31 passes to pivotally secure the cylinder 30 to the supporting plate 14, the piston rod 32 extending from the cylinder 30 and being pivotally connected to the rocker arm 29, this cylinder 30 at its lug end having a solenoid actuated valve 33 connected thereto, a tension spring 34 secured between the outer end of the rocker arm 29 and a pin or like 35 secured to the mounting plate 14 yieldingly tending to move the piston rod 32 to an inward position.

Similarly at the other end of the rocker arm 29 there is a cylinder 36 which extends rearwardly in this case with a lug 36a through which a pivot 36b passes to pivotally secure the cylinder 36 to the mounting plate 14, the piston rod 37 extending from the cylinder 36 and being pivotally connected to the rocker arm 29, this cylinder 36 at its lug end having a solenoid actuated valve 38 connected thereto which in turn has an air pressure pipe 22 connected thereto, a tension spring 39 secured between the outer end of the rocker arm 29 and a pin or like 40 secured in the mounting plate 14 yieldingly tending to move the piston rod 37 to an inward position.

An electric wire 41 is connected between the switch 6 and a terminal on the solenoid valve 38, a wire 42 similarly passing between the switch 6a and the solenoid valve 33 and a further wire 43 between the switch 6b and the solenoid valve 21.

Electric current as from one pole of a battery 44 passes by wire 45 to the remaining terminals of each of the switches 6, 6a and 6b, the other pole of the battery 44 being wired to ground, the terminals remaining of each of the solenoid valves 21, 33 and 38 also being grounded, or if so desired, instead of the ground return circuit as composed of the chassis of the two traction units and the intermediate earth moving machine or the like, there may be wired connections as giving more positive connection.

The pressure pipes 22 common to the solenoid valves 21, 33 and 38 pass to an air vessel E containing compressed air and the pipe 22 is sufficiently flexible at least in the vicinity of each of the cylinders 19, 30 and 36 to permit of their free pivotal movement, the solenoid valves when energized permitting flow of compressed air to the cylinders, but when not energized permitting release of the air from within the cylinders.

Also if so required, the switch 6b instead of being in the position as shown in FIG. 1 could be in a directly opposite position on the bracket 5, the cam part 3c placed opposite to the position shown, the solenoid valve 21 applied to the lug end of the cylinder 19 and a tension spring applied in place of the compression spring 23 so as to hold the piston rod 18 in an inward position, in which case the gear levers 1 and 2 would normally be in the central neutral positions 9 and 9a within the respective slots 8 and 8a instead of 7 and 7a as shown in the drawings.

In use or operation, with the manually operated gear lever 1 of the front traction unit in the midway neutral position 9, the gear lever 2 in the rear traction unit is also in the midway neutral position 9a and these levers 1 and 2 are within the slots 7 and 7a respectively and so the three solenoid valves 21, 33 and 38 are closed and the apparatus as shown in FIG. 1.

Considering the low gear position to be position 11 in the slot 7, the gear lever 1 is manually moved to such position and in doing so, the cam part 3b of the cam plate 3 on such gear lever 1 depresses the lever 6c of the switch 6a with the result that electric current passes through the wire 42 to the solenoid valve 33 and energised the solenoid thereof whereby its valve is opened to admit compressed air from the pipe 22 to the cylinder 30 so that the piston rod 32 is moved outwardly as shown in FIG. 6, thereby causing that end of the rocker arm 29 to which the rod 32 is connected to move rearward whereby the crosshead pin 27 is also moved rearward within the crosshead guide 26 and similarly the connecting rod 24 moves rearward to pull the gear lever 2 to rearward position within the slot 7a which is the position 11a in such slot shown in FIG. 6.

However, the remote controlled gear box of the rear power unit may not be in an immediately meshable condition in which case the linkage is unable to move the gear lever 2 to desired position and so the rocker arm 29 effects a rocking motion about its crosshead pin 27 whereby the spring 34 of the cylinder 30 which is subject to the pressure is stretched and also the spring 39 of the other cylinder 36 similarly stretched because of the spindle 37 being pulled outwardly by the rock of the rocker arm 29 (even though there is no pressure within that cylinder 36).

In this state, the apparatus remains set to effect the desired operation when the gears reach a meshable position and when this occurs, the spring 39 which has been stretched and the piston rod 37 partly withdrawn from the cylinder 36 return to normal position whereby that end of the rocker arm 29 to which the piston rod 32 is connected is moved rearward and so the connecting rod 24 and the gear lever 2 are also moved rearward.

Thus it will be seen that there is an inter-action between the operation of the cylinders 30 and 36 and their respective springs 34 and 39 which allows for delayed action of movement of the gear lever 2 when gear meshing conditions prevent immediate change of gear.

On the gear lever 1 of the front traction unit being then moved back to neutral position 9, its cam plate 3 part 3b is moved clear of the lever 6c of the switch 6a so that the electric current passing to the solenoid valve 33 is interrupted and the air pressure within the cylinder 30 released so that the stretched spring 34 draws the rocker lever forward, moves the piston rod 32 back into the cylinder 30 and pushes the connecting rod 24 and the gear lever 2 forward to the neutral position 9a.

Now considering that the next gear position to be position 12 in the front end of the slot 8, the driver of the front traction unit manually moves the gear lever 1 across the neutral position 9 into the slot 8 and then moves the gear lever 1 forward to the gear position 12.

The first part of this movement causes the cam part 3c of the cam plate 3 to depress the lever 6c of the switch 6b and the second part of the movement causes the cam part 3a to depress the lever 6c of the switch 6, with the result that firstly the solenoid valve 21 is energised by the electric current through wire 43 from switch 6b and then the solenoid valve 38 is energised by the electric current through wire 41 from switch 6 whereby the piston rod 18 of the cylinder 19 is drawn inwardly thereto against the resistance to such action as imposed by the compression spring 23 so that the gear lever 2 is drawn across the neutral position slot 9a into the slot 8a and then the piston rod 37 is pushed outwardly from the cylinder 36 whereby the end part of the rocker lever 29 to which such piston rod 37 is connected is pushed forwardly, this forward motion being imparted by way of the crosshead pin 27 and the connecting rod 24 to the gear lever 2 whereby it is moved into the position 12a which coincides with the position 12 of the gear lever 1 of the forward traction unit.

It accordingly follows that, if the next gear position is 13, when the gear lever 1 is moved to such position, the switch 6 will be first released and the switch 6a depressed while the switch 6b remains depressed, whereby the air pressure in the cylinder 36 is released and air pressure applied to cylinder 30, the pressure being retained within the cylinder 19, this resulting in the rocking of the rocker lever 29 to an opposite travel position whereby the gear lever 2 is moved to position 13a corresponding to the position 13 of the front traction unit gear lever 1.

On return of the gear lever 1 to neutral position 9 and the return of same across the neutral position slot to within the slot 7, the cam part 3c of the cam plate 3 moves clear of the switch 6b so that the flow of current through wire 43 to the solenoid valve 21 ceases whereby air pressure within the cylinder 19 is stopped and released, thereby enabling the compression spring 23 to push the piston rod 18 outwardly whereby the gear lever 2 is pushed across the neutral position 9a into the slot 7a.

I claim:
1. Remote control apparatus for effecting gear changing comprising a first vehicular power unit, transmission means having gearing means therein, said transmission means disposed in said first vehicular power unit, a gear changing member operably connected to said transmission means to effect changes in said gearing means, controller means mounted adjacent said gear changing member, cam means mounted on said gear changing member for engaging said controller means upon movement of said gear changing member, a second vehicular power unit connected to said first vehicular power unit, further transmission means having further gearing means therein, said further transmission means disposed in said second vehicular power unit, a further gear changing member connected to said further transmission means to effect changes in said further gearing means, further controller means mounted adjacent said further gear changing member, connecting means disposed between said first vehicular power unit and said second vehicular power unit for interconnecting said controller means on said first vehicular power unit and said further controller means on said second vehicular power unit, said further gear changing member on said second vehicular power unit being remotely moved in like manner as said gear changing member on said first vehicular power unit through both said controller means and connecting means, and additional means engaging said further gear changing member to move the same to and maintain the same in a neutral position when said gear changing member on said first vehicular power unit is moved to and disposed in a neutral position.

2. Remote control apparatus as claimed in claim 1 wherein said additional means engaging said further gear changing member on said second vehicular power unit includes means for applying a sideways push and pull on said further gear changing member and a further means for applying push and pull thereto in forward and backward directions.

3. Remote control apparatus as claimed in claim 2 wherein the means for applying sideways push and pull on said further gear changing member comprises a ball part secured to a plate secured to the further gear changing member, a complementary socket engaging the ball part and secured to the end of the piston rod of a pressure cylinder which is pivotally mounted on a mounting plate, a solenoid valve connected to the cylinder, an air pressure pipe connected to said solenoid valve, air pressure when admitted to the cylinder through the solenoid valve effecting movement of the piston rod within the cylinder in one direction and spring means yieldingly moving the piston rod in an opposite direction.

4. Remote control apparatus as claimed in claim 2 wherein the means for applying push and pull to said further gear changing member in forward and backward directions comprises a ball part secured to a plate secured to the further gear changing member, a complementary socket engaging the ball part and secured to one end of a connecting rod the other end of which has a clevis which pivotally engages a crosshead pin, crosshead blocks mounted on said crosshead pin whereby the pin is slidable within a crosshead guide, a rocker lever pivotally engaged at its centre part on the crosshead pin and having arms extending away therefrom in opposite directions, a cylinder having a piston rod extending substantially parallel to said connecting rod and forward from the rocker lever while being pivotally mounted on a mounting plate with its piston rod pivotally connected to one arm of the rocker lever, a solenoid valve connected to the cylinder, an air pressure pipe being connected to said solenoid valve, a tension spring connected between the one arm of the rocker lever and a pin secured to the mounting plate to yieldingly move the piston rod within the cylinder, a further cylinder having a further piston rod extending substantially parallel to said connecting rod and rearward from the other arm of the rocker lever and also being pivotally mounted on the mounting plate, a further solenoid valve connected to said further cylinder, said air pressure pipe being connected to said further solenoid valve, said further piston rod pivotally connected to the other arm of said rocker lever, and a tension spring connected between the other arm of the rocker lever and a pin secured to the mounting plate to yieldingly move the further piston rod of this rearwardly extending further cylinder thereinto.

5. Remote control apparatus as claimed in claim 1 wherein the controller means on said first vehicular power unit comprises electric switches disposed around said gear changing member, said cam means being moved by the gear changing movements of the gear changing member to actuate at least one of the switches to effect a gear change.

6. Remote control apparatus as claimed in claim 5 wherein the electric switches have levers extending therefrom and are mounted on a bracket with one switch disposed in front, one behind and one to one side of the gear changing member, said cam means secured thereto having three cam parts extending above each of the levers of the switches.

7. Remote control apparatus for effecting gear changing comprising a first vehicular power unit, transmission means having gearing means therein disposed in said first vehicular power unit, a gear changing lever operably connected to said transmission means to effect changes in said gearing means, a plurality of switches mounted adjacent said gear changing lever, a cam member mounted on said gear changing lever for engaging said switches upon movement of said gear changing lever, a second vehicular power unit connected to said first vehicular power unit, further transmission means having further gearing means therein, said further transmission means disposed in said second vehicular power unit, a further gear changing lever connected to said further transmission means to effect changes in said further gearing means, a plurality of solenoid operated valves mounted on said second vehicular power unit, each solenoid operated valve being operatively connected to a pivotable cylinder and piston device, one pivotable cylinder and piston device being operatively connected directly to said further gear changing lever, at least two other pivotable cylinder and piston devices being operatively connected indirectly to said further gear changing lever through a lever arrangement, electric leads operatively connecting said switches to said solenoid operated valves, a source of supply connected to said electric leads, and means connected to said cylinder and piston devices through said solenoid operated valves to actuate said cylinder and piston devices to move said further gear changing lever in accordance with said gear changing lever.

8. Remote control apparatus according to claim 7 in which said one cylinder and piston device has a spring member mounted thereon to bias said further gear changing lever in one direction when the switch to the solenoid operated value of said one cylinder and piston device is inoperative.

9. Remote control apparatus according to claim 7 in which said lever arrangement consists of a connecting rod having one end operatively connected to said further gear changing lever, a cross-head guide mounted between said at least two other pivotable cylinder and piston devices, a rocker arm slidably mounted on said cross-head guide and being pivotably mounted at its center portion to the other end of said connecting rod, one of said other pivotable cylinder and piston devices operatively connected to said rocker arm on one side of the center portion thereof and the other of said other pivotable cylinder and piston devices operatively connected to said rocker arm on the other side of the center portion thereof, and biasing means connected to said rocker arm to maintain said further gear changing lever in a neutral position when the switches to the solenoid operated values of said other cylinder and piston devices are inoperative.

References Cited in the file of this patent
UNITED STATES PATENTS

| | | |
|---|---|---|
| 1,943,694 | Padgett | Jan. 16, 1934 |
| 2,026,827 | Dillon | Jan. 7, 1936 |
| 2,161,153 | Gallun et al. | June 6, 1939 |
| 2,445,716 | Sternberg | July 20, 1948 |
| 2,582,895 | Young | Jan. 15, 1952 |
| 2,637,222 | Backus | May 5, 1953 |
| 2,640,374 | Willis | June 2, 1953 |
| 2,932,988 | Flynn et al. | Apr. 19, 1960 |